May 17, 1932.  H. BRADLEY  1,858,914
APPARATUS FOR THE MEASUREMENT OF FEET, LASTS, AND THE LIKE
Filed May 31, 1928  4 Sheets-Sheet 1

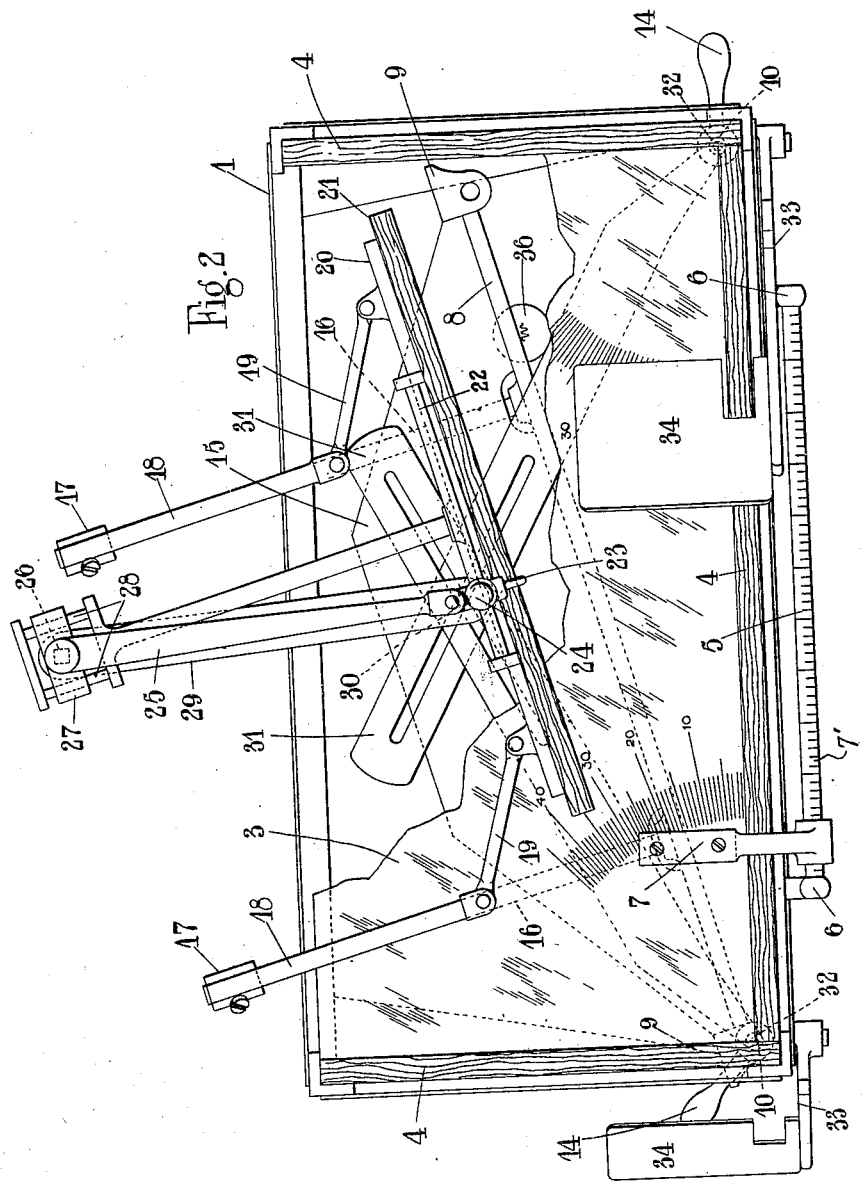

May 17, 1932. H. BRADLEY 1,858,914
APPARATUS FOR THE MEASUREMENT OF FEET, LASTS, AND THE LIKE
Filed May 31, 1928 4 Sheets-Sheet 4

Patented May 17, 1932

1,858,914

UNITED STATES PATENT OFFICE

HARRY BRADLEY, OF LONDON, ENGLAND, ASSIGNOR TO THE BRITISH BOOT, SHOE AND ALLIED TRADES RESEARCH ASSOCIATION, OF LONDON, ENGLAND

APPARATUS FOR THE MEASUREMENT OF FEET, LASTS, AND THE LIKE

Application filed May 31, 1928, Serial No. 281,834, and in Great Britain July 7, 1927.

This invention relates to methods of measurement of feet, lasts and the like and is particularly concerned with improved forms of apparatus for performing such methods of measurement.

The object of the invention is to provide apparatus for the measurement of feet, lasts and the like according to a method which is much simpler and more effective than methods hitherto adopted.

The principles underlying the invention will be indicated hereinafter, but in its broadest aspect the invention consists in apparatus comprising mechanical means adapted to indicate the data from which the focal ratio of the foot or last may be measured or calculated.

The invention also consists in apparatus according to the preceding paragraph having indicating means for giving a direct reading of the focal angle of the foot or last.

A further feature of the invention consists in apparatus adapted to determine the length, focal angle and focal ratio of the foot or last, comprising mechanical means adapted to be located tangentially to the two sides of the foot or last and to intercept (when produced if necessary) at a point herein termed the focus, and means at right angles to the tangent to the inner side of the foot or last adapted to contact respectively with the toe and heel of the foot or last.

Further features of the invention will be apparent from the following detailed description in conjunction with the accompanying drawings.

In the drawings:—

Figure 2 shows a plan view, with parts removed, of one form of apparatus, given by way of example, in accordance with the broad feature of the invention;

Hitherto in order to determine the shape of a foot it has been essential to make somewhat extensive measurements consisting of the measurement of the length, the girth, the ankle measurement and various other factors. This has resulted in a very complicated process and there has been little standardization in what are considered the essential factors which determine the size and shape of the foot.

Figure 1:
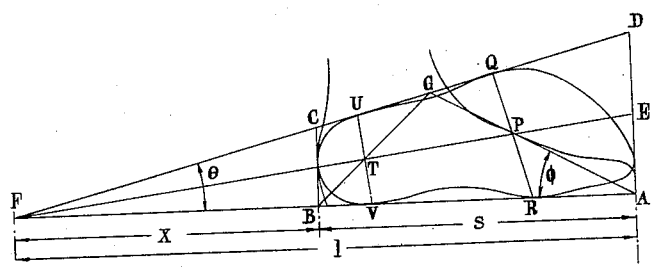
Figure 1 is a diagram, which will be described in detail later, illustrating the underlying principle of the invention.
Figure 5:
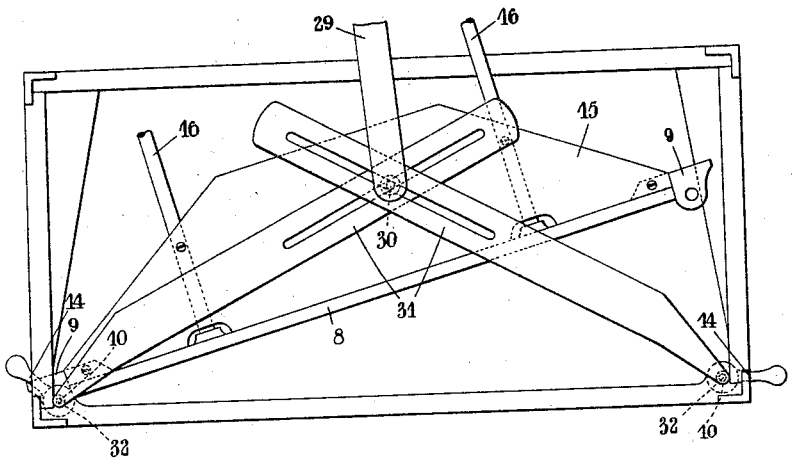
Figure 5 shows in simpler form some of the more important parts of the apparatus shown in Figure 2.

In Figure 1 there is shown in plan the outline of a foot. If two tangents are drawn at the sides of the foot and furthermore if two end tangents are drawn at the front and at the rear of the foot, these being at right angles to the inside side tangent, then the quadrilateral figures A B, C D determines the shape and size of the foot. If the lines A B, D C are then continued to meet in a point F the angle ($\theta$) between the two side tangents (A B, D C) of the foot is termed the focal angle; the point (F) where the two side tangents of the foot meet I call the focus; the ratio of the lengths F B and F A which are represented respectively by $x$ and $l$ I call the focal ratio. This I denote by $p$. It will be seen that the length of the foot $s$ is equal to $l-x$.

If now along the line F D I mark off the length F G such that F G is equal to $\sqrt{xl}$ then it is found that the point G coincides with the projection at the posterior end of the fifth metatarsal. If I join the points G B and G A and draw F E the bisector of the angle $\theta$, then G A and F E intersect in a point P and G B and F E intersect in a point T. If through the point P, I draw a line Q R at an angle to F E equal to $90-\theta$ then it is found that the line Q R is the joint or tread line. A line U V through T at right angles to F E gives me the seat line. Furthermore if the profile of the foot in elevation be superimposed in the quadrilateral A B, C D it is found that with normal feet the line A P coincides for the most part with the slope of the instep and that the point P always lies on the instep. From this quadrilateral and the various lines shown in Figure 1 many geometrical relations may be deduced but it is sufficient to say that the three factors $s$ $\theta$ and $\rho$ are sufficient to determine wholly the size and shape of the foot and that any further measurements except $s$ $\theta$ and $\rho$ are superfluous.

Sufficient indication has been given above of one or two geometrical relations in the diagram of Figure 1 and I will now indicate one simple method by which the three essential constituents may be easily determined. Let the angle G A B be denoted by the symbol $\phi$. It will be seen that the triangles F G A and F G B are similar and the angle F G B is therefore equal to $\phi$. From the well-known trigonometrical relation may be obtained the formula—

$$\frac{FB}{\sin FGB} = \frac{FG}{\sin FBG}$$

or $$\frac{x}{\sin \phi} = \frac{\sqrt{xl}}{\sin (\theta + \phi)}$$

$$\therefore \sqrt{\frac{x}{l}} = \frac{\sin \phi}{\sin (\theta + \phi)} = \sqrt{\rho}$$

It will be seen therefore that if the two angles $\theta$ and $\phi$ can be determined it will be possible from the above equation and the simple measurement of the length of the foot ($s$) to obtain all the information required to define exactly the shape and size of the normal foot. Charts may be drawn up along one side of which several values of $\theta$ are given and along the other side values of $\phi$ are given; the intervening squares may then be drawn up in tabulated form giving values of $\rho$ as follows:—

| $\theta \rightarrow$ | 9° | 10° | 11° | 12° | 13° |
|---|---|---|---|---|---|
| $\phi$ | | | | | |
| 25° | .571 | .543 | .517 | .493 | |
| 26° | .584 | .556 | .531 | .507 | |
| 27° | .597 | .569 | .544 | .520 | |
| 28° | .610 | .582 | .557 | .533 | |

It is obvious that many forms of apparatus may be designed to determine the three essential factors set out above. Any form of apparatus by which these factors may be determined may be used in accordance with the broad features of the invention.

In Figures 2 to 5 I show one convenient form and I will now proceed with the detail description of this form which I give by way of example. In this example I have rectangular box 1 mounted upon any suitable base board 2. On the top of this box upon any suitable support I mount a foot plate 3 which in this example takes the form of a graduated glass screen. This is held in place on its top side by suitable pieces of wood 4. Along one side of the box I mount a rod 5 upon any suitable form of supports 6 and slidably mounted upon this rod there is a piece of wood, metal or other suitable material 7.

Below the glass sheet 3 there is a bar 8 on either end of which bearing members 9 are fixed, these bearing members 9 having holes drilled therein which may be pierced by circular rods 10. The rods 10 are adapted to move in suitable mountings 11 and each carries a cylindrical boss 13 fastened to which is a catch 14 which may move the member 10 in a vertical direction under the control of spring 12. The catches 14 are adapted to engage in notches, one of which is shown in dotted outline in Figure 4. When the catch is in its upper position the member 10 engages with the bearing member 9 as indicated on the left in Figure 2 and in Figure 4. When the catch 14 is depressed the upper end of the rod 10 lies below the upper surface of the top bearing member 11 and so the member 9 is not engaged as indicated to the right of Figure 2. It will be seen therefore that the bar member 8 can be pivoted about either end. It is provided with a flat plate 15 whose purpose will be indicated hereinafter.

To one side of the bar 8 there are attached two connecting members 16 which by means of curved members 17 are connected to further connecting members 18 lying above the glass plate. Pivotally connected at the ends of members 18 are two rods 19 at the other ends of which is pivotally connected a bar 20 made of suitable material. Fastened to the bar 20 is a piece of wood or any other like material 21 which may be called the side plate. A small rod 22 is mounted on the top side of the plate 20 and along this is adapted to slide a pointer 23 which carries a knob or handle 24. This knob is connected to a rod 25 which rotates in a bearing 26. This bearing 26 is mounted upon a bearing 27 which itself can slide along small rods 28. By means of a flattened circular rod any rotation of 25 is transmitted to a flat bar 29 lying immediately beneath 25.

The bar 29 carries a small pin or knob 30 which engages simultaneously in slots or grooves made in thin flat members 31 each of which is rotatable about the same axis provided for the bar member 8. Small bearings 32 are attached to the members 31 for this purpose.

At the corners of the box where these bearings are located there are also provided two arms 33 rotatable about a horizontal axis and each carrying a flat plate 34. A suitable scale 35 is mounted behind the arms 33 so that the inclination of these arms may be easily determined.

To the base board 2 small sources of illumination 36 are attached.

When it is desired to measure the foot or last it is placed upon the glass screen 3 and in Figure 2 the toes will be pointing to the right in the case of the left foot. Member 7 is then moved along until it touches the heel and the length of the foot is read off upon any suitable scale 7'. For the left foot the member 8 is pivoted at the left-hand end shown at Figure 2 and the wooden side plate 21 is rotated about the bearing 10 and also moved upon its own links 19 so that it touches the side of the foot tangentially. The outline of the bar 8 is then thrown upon the glass screen and the angle is read off upon any suitably graduated scale, the flat plate 15 shielding the part of the scale not required.

The locating member 23 is then moved along the rod 22 until it is adjacent to or touching the projection located at the posterior end of the fifth metatarsal. As the member 23 is moved the relative rotation of the bar 25 causes a rotation of the right-hand member 31 through the flat member 29 and the knob 30. The shadow caused by the right-hand member 31 is then read off on a suitable graduated scale at the right-hand end of the box. It will be seen then that the three measurements giving the length of the foot and the two angles will give the essential factors $s$ $\theta$ and $\rho$.

While the foot is on the glass plate 3 the arm 33 can be brought up so that the plate 34 attached thereto lies along the instep and the angle of the instep may be read off on the scale 35. Any deviation from the line G A shown in Figure 1 may be denoted to define the flatness or archness of a foot.

When it is required to measure the right foot then the catch at the left-hand end is released and the bar 8 is pivoted at the right-hand end of the box. 21 and 23 are then moved as before and the angles are read off on the graduated scales. The left-hand arm 33 can also be brought up and the inclination of the instep of the right foot may thus be easily determined.

It will be seen that member 21 always moves so that it is parallel to the bar 8 and so the outside tangent to the foot is defined in terms of the angle which it makes with the inside tangent, this being given by the longitudinal wooden member 4 shown at the bottom end of the drawings in Figure 2.

By means of this apparatus the measurements of the foot may also be determined when it is in an arched condition, that is to say, when the heel is supported at a height above the level of the flat of the foot.

The apparatus described above may thus be utilized in a very simple way to measure and determine exactly and sufficiently the size and shape of left or right foot in the flat or in the elevated position.

The embodiment shown in Figures 2 to 5 is given merely by way of example for it is obvious that many other forms and apparatus may be designed to fulfill the essential conditions according to the broad scope of the invention as defined in the appendant claims; for instance, suitable dials may be associated with the bar 8 and plate members 31 by means of gears so that they give direct readings of the angles.

It is not necessary that a source of illumination be placed beneath the plate 3 since this may obviously be made wholly transparent with the angular graduations marked thereon.

There is nothing on a last corresponding to the projection on the fifth metatarsal and consequently $\rho$ cannot be determined by utilizing this point on the last as can be done on the foot. $\rho$, however, can be determined by measuring the ratio $$\frac{BC}{AD}$$

which by referring to Figure 1 will be seen to be equal to $$\frac{FB}{FA}=\rho.$$

Figure 3:
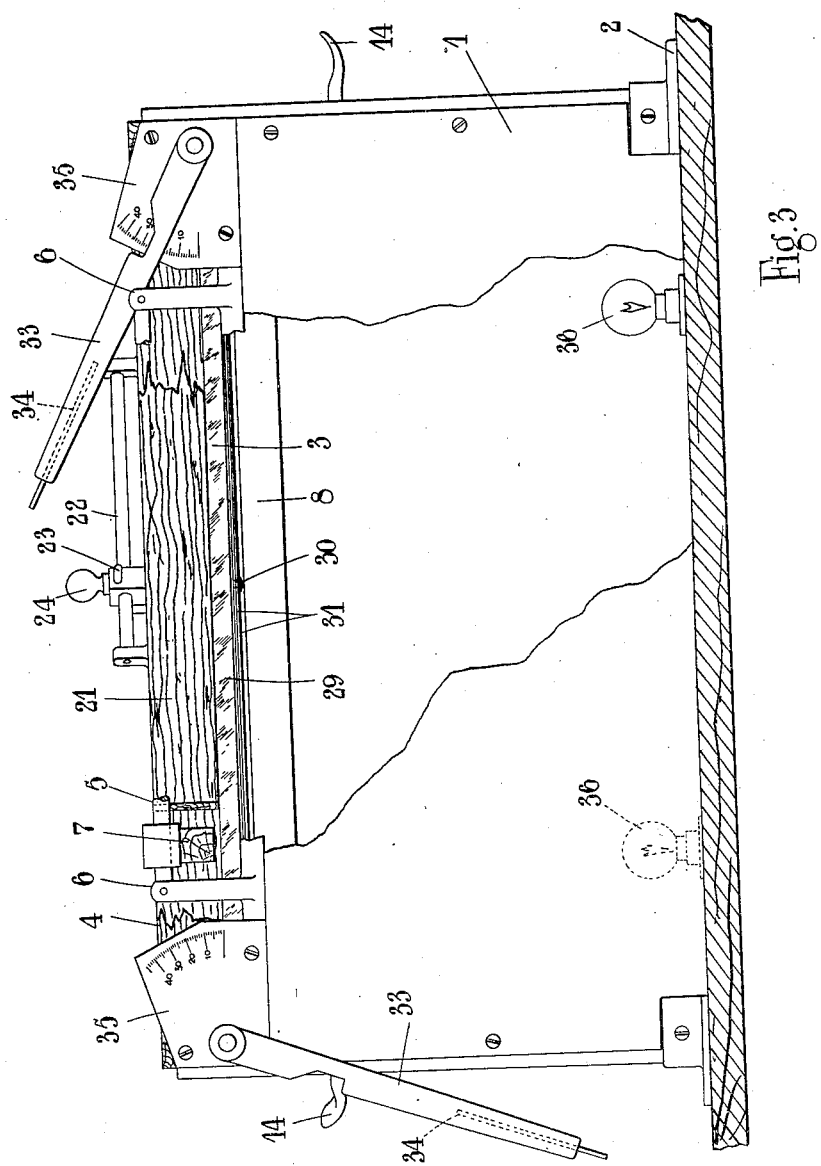
Figures 3 and 4 show respectively a side elevation and an end elevation, with parts removed, of the form of apparatus shown in Figure 2.
Figure 4:
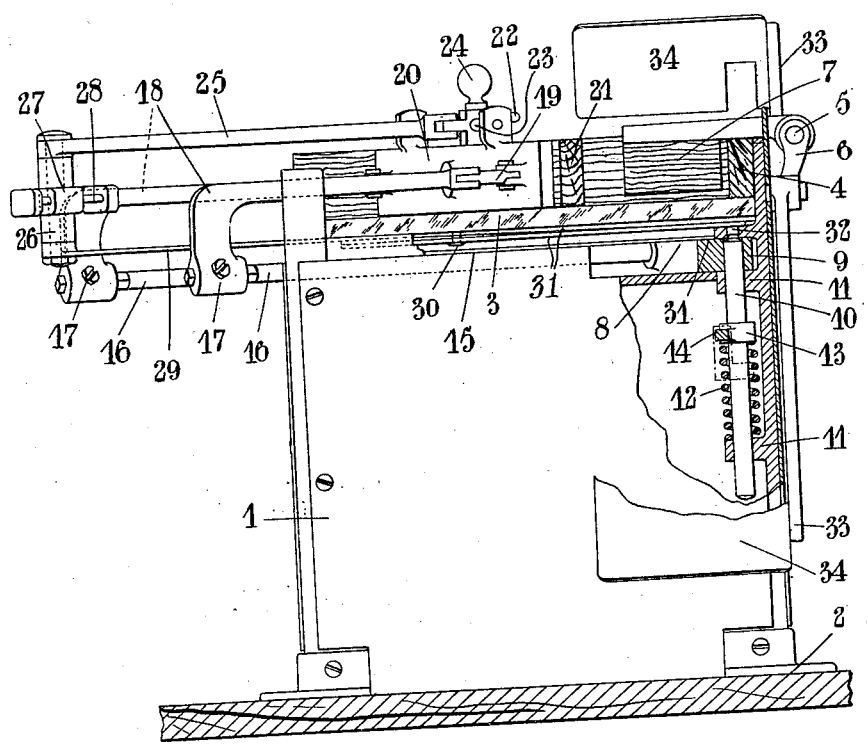

Tables can then be drawn up giving $\rho$ for various values of AD and CB. It will be seen thereof that $\rho$ can be obtained by making other forms of measurements than those for which the apparatus shown in Figures 2 and 3 is adapted. These can easily be determined from the geometrical consideration of Figure 1.

Various other modifications will readily suggest themselves to those skilled in the art.

Having now described my invention, what I claim as new and desire to secure by Letters Patent is:—

1. Foot and last measuring apparatus adapted to determine the length, focal angle and focal ratio of the foot or last comprising in combination means adapted to give a measurement of the length of the foot, mechanical means adapted to be located tangentially to the two sides of the foot or last and to intercept (when produced if necessary) at a point herein termed the focus, means at right angles to the tangent to the inner side of the foot or last adapted to contact respectively with the toe and heel of the foot or last, means slidable along said mechanical means tangential to the outside of the foot or last to locate the fifth metatarsal posterior projection, and a member associated with said slidable means, said member being adapted to give in angular measurements the relative longitudinal movements of said locating member.

2. Foot and last measuring apparatus comprising in combination a pivoted bar, a side plate associated therewith and adapted to move with said bar parallel to an edge thereof and lie along one side of the foot or last to be measured, a locating member adapted to move along the side plate, means to give indication of the angular movement of said bar and means adapted to give in angular measurements the relative movements of said locating member.

3. Foot and last measuring apparatus comprising in combination a pivoted side plate adapted to lie along one side of the foot or last to be measured, a locating member adapted to move along the said side plate, and means adapted to give in angular measurements the relative rotational and longitudinal movements of the side plate and locating member respectively.

4. Foot and last measuring apparatus comprising in combination a box, a bar adapted to be pivoted about one or other of its ends at two corners of said box respectively, a side plate connected to said bar and adapted to move with said bar parallel to one edge thereof and adapted to lie along one side of the foot or last to be measured, a locating member adapted to move parallel to the side plate, and a member which is adapted for angular movement by movement of said locating member, said member being pivoted at the corner at which the bar is not for the time being pivoted.

5. Foot and last measuring apparatus comprising in combination a box, a bar adapted to be pivoted about one or other of its ends at two corners of said box respectively, a side plate connected to said bar and adapted to move with said bar parallel to one edge thereof and adapted to lie along one side of the foot or last to be measured, a locating member adapted to move parallel to the side plate, a member pivoted at the corner at which the bar is not for the time being pivoted, such member being given angular movement by movement of said locating member, a baseplate upon which the foot or last is adapted to rest there being a graduated scale provided on said baseplate, said scale being adapted to indicate the angular movements of said bar and the member movable under the control of the said locating member.

6. Foot and last measuring apparatus comprising in combination a box, a bar adapted to be pivoted about one or other of its ends at two corners of said box respectively, a side plate connected to said bar and adapted to move with said bar parallel to one edge thereof and adapted to lie along one side of the foot or last to be measured, a locating member adapted to move parallel to the side plate, a member pivoted at the corner at which the bar is not for the time being pivoted such member being given angular movement by movement of said locating member and a plate provided at each of said corners, said plates being rotatable about a horizontal axis to measure the slope of the instep.

7. Foot and last measuring apparatus by which the shape of the foot may be determined having means adapted to give a measurement of the length of the foot, a movable bar adapted to be located tangentially to the outside of the foot, a scale from which the angle of said bar may be read, a member slidable along said bar to locate the fifth metatarsal posterior projection and a member associated with said first-named member, said last-named member being adapted to give in angular measurements the relative longitudinal movements of said locating member.

8. Foot and last measuring apparatus as claimed in claim 7 comprising mechanical means adapted to be located alternatively tangentially to the left and right sides of the foot or last and to intercept (when produced if necessary) at a point herein termed the focus and means at right angles to the tangent of the inner side of the foot or last adapted to contact respectively with the toe and heel of the foot or last.

In testimony whereof I have signed my name to this specification.

HARRY BRADLEY.